United States Patent
Vogler

(10) Patent No.: US 11,090,759 B2
(45) Date of Patent: Aug. 17, 2021

(54) ULTRASONIC VIBRATION SYSTEM HAVING AN AMPLITUDE TRANSFORMER MOUNTED ON THE LATERAL SURFACE

(71) Applicant: Herrmann Ultraschalltechnik GmbH & Co. KG, Karlsbad (DE)

(72) Inventor: Ulrich Vogler, Uhldingen-Muhlhofen (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 277 days.

(21) Appl. No.: 16/325,474

(22) PCT Filed: Aug. 29, 2017

(86) PCT No.: PCT/EP2017/071620
§ 371 (c)(1),
(2) Date: Feb. 14, 2019

(87) PCT Pub. No.: WO2018/041811
PCT Pub. Date: Mar. 8, 2018

(65) Prior Publication Data
US 2019/0210146 A1 Jul. 11, 2019

(30) Foreign Application Priority Data
Sep. 2, 2016 (DE) ...................... 10 2016 116 430.5

(51) Int. Cl.
*B23K 20/00* (2006.01)
*B23K 20/10* (2006.01)
(Continued)

(52) U.S. Cl.
CPC .......... *B23K 20/106* (2013.01); *B06B 1/0207* (2013.01); *B06B 1/06* (2013.01);
(Continued)

(58) Field of Classification Search
CPC .. B06B 2201/72; B23K 20/106; B23K 20/10; B26D 7/086; B65B 51/225
See application file for complete search history.

(56) References Cited

U.S. PATENT DOCUMENTS 3,939,033 A 2/1976 Grgach et al.
4,607,185 A * 8/1986 Elbert ...................... B06B 3/00
310/323.19
(Continued)

FOREIGN PATENT DOCUMENTS

CN 1294558 A 5/2001
CN 101340985 A 1/2009
(Continued)

OTHER PUBLICATIONS

China National Intellectual Property Administration, Office Action, dated Apr. 28, 2020, Chinese Patent Application No. 201780052149.6 (With English Translation).
(Continued)

*Primary Examiner* — Erin B Saad
(74) *Attorney, Agent, or Firm* — Paul & Paul

(57) ABSTRACT

The present invention relates to an ultrasonic vibration system (1) comprising a sonotrode which has two sonotrode end faces (8, 8') and a circumferential lateral surface that connects said sonotrode end faces (8, 8') with each other. The sonotrode has an elongate core element (2) and at least one wing element (3, 4), each core element (2) and wing element (3, 4) longitudinally extending from the one sonotrode end face (8) to the other sonotrode end face (8'). The wing element (3, 4) has a sealing surface (7) which is designed to be in contact with a material for the purpose of processing same and which is connected to the core element (2) via a plurality of longitudinally interspaced connecting portions (5, 6). The ultrasonic vibration system further comprises a converter (9) which is optionally connected to
(Continued)

Figure 1:
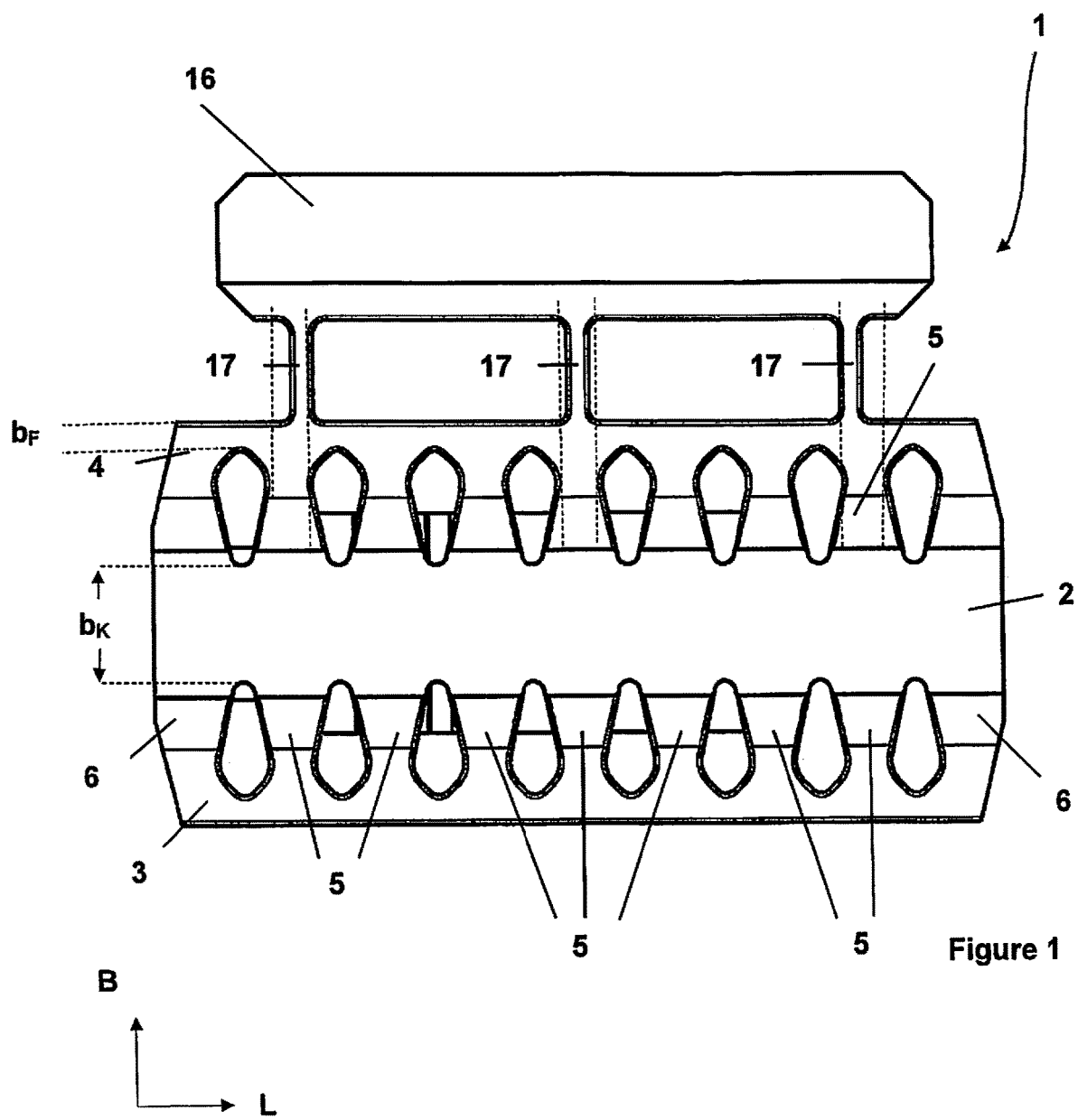

the sonotrode via an amplitude transformer (11). According to the invention, the converter (9) or the amplitude transformer (11) is connected to the lateral surface of the sonotrode.

20 Claims, 5 Drawing Sheets

(51) Int. Cl.
  B06B 1/06 (2006.01)
  B26D 7/08 (2006.01)
  B06B 1/02 (2006.01)
  B06B 3/00 (2006.01)
(52) U.S. Cl.
  CPC .............. B26D 7/086 (2013.01); *B06B 3/00* (2013.01); *B06B 2201/40* (2013.01); *B06B 2201/72* (2013.01)

(56) References Cited

U.S. PATENT DOCUMENTS

| | | | | |
|---|---|---|---|---|
| 5,730,351 | A | * | 3/1998 | Hermann .................. B06B 3/00 156/580.1 |
| 5,884,833 | A | | 3/1999 | Sato et al. |
| 6,605,178 | B1 | * | 8/2003 | Shinohara ............... B29C 65/08 156/379.6 |
| 8,887,784 | B2 | | 11/2014 | Thaerigen |
| 9,056,427 | B2 | | 6/2015 | Vogler |
| 9,862,513 | B2 | | 1/2018 | Hull |
| 2006/0193914 | A1 | | 8/2006 | Ashworth et al. |
| 2008/0237299 | A1 | | 10/2008 | Vogler et al. |
| 2012/0012258 | A1 | | 1/2012 | Vogler |
| 2013/0213580 | A1 | | 8/2013 | Thaerigen |
| 2019/0210066 | A1 | * | 7/2019 | Vogler ................. B23K 20/106 |

FOREIGN PATENT DOCUMENTS

| | | |
|---|---|---|
| CN | 102421585 A | 4/2012 |
| CN | 202540748 U | 11/2012 |
| CN | 103118857 A | 5/2013 |
| EP | 0211007 A1 | 2/1987 |
| EP | 1740156 B1 | 7/2011 |
| EP | 2353737 A1 | 8/2011 |
| EP | 2743060 A1 | 6/2014 |
| JP | 2005-313209 A | 11/2005 |
| JP | 2007533692 A | 11/2007 |
| JP | 4147309 B2 | 7/2008 |
| JP | 2008528654 A | 7/2008 |
| JP | 2013544625 A | 12/2013 |
| TW | 362054 | 4/1986 |

OTHER PUBLICATIONS

Marco Naujoks, International Preliminary Report on Patentability (English Translation), PCT/EP2017/071620, European Patent Office, dated Dec. 18, 2018.

Office Action, dated May 19, 2020, Japanese Patent Application No. 2019-510709 (with English translation).

* cited by examiner

ULTRASONIC VIBRATION SYSTEM HAVING AN AMPLITUDE TRANSFORMER MOUNTED ON THE LATERAL SURFACE

CROSS-REFERENCE TO RELATED APPLICATION

This application is a 371 national stage application of International Application PCT/EP2017/071620, filed Aug. 29, 2017, and claims the priority of German Application No. 10 2016 116 430.5, filed on Sep. 2, 2016.

The present invention relates to an ultrasonic vibration system with a sonotrode which has two sonotrode end faces and a circumferential lateral surface that connects the two sonotrode end faces to each other, wherein the sonotrode has an elongate core element and at least one wing element, wherein core element and wing element each extend from one sonotrode end face to the other sonotrode end face, wherein the wing element has a sealing surface which is provided to come into contact with a material for the processing thereof and is connected to the core element via a plurality of connecting portions spaced apart from each other in the longitudinal direction of the core element.

Such an ultrasonic vibration system is known from EP 2 353 737 B1.

The distinctive feature of this type of sonotrode is that the elongate sealing surface executes a vibration in a plane (in-plane vibration), which is advantageous for certain applications.

Most other known sonotrodes are constructed in such a way that they can be excited with a longitudinal vibration, with the result that a standing wave forms in the direction of their longitudinal axis. The sealing surface is then at a vibration maximum and executes a longitudinal vibration in the direction of the material to be processed. Basically the sonotrode moves at an ultrasonic frequency in the direction of the material to be processed and back again and thus "hammers" on the material.

By contrast, in the case of the sonotrode named at the beginning an in-plane vibration is impressed on the sealing surface, with the result that the sealing surface is moved back and forth on the material to be processed and a friction welding is effected.

The idea forming the basis of EP 2 353 737 B1 is to excite the sonotrode with a kind of bending vibration, such that the core element and wing element move in opposite directions relative to each other.

Here, the core element is excited and, due to the connection of the wing elements via the plurality of connecting portions, this leads to a movement in the opposite direction of the sealing surface located on the wing element.

In EP 2 353 737 B1 the core element is excited by a converter arranged symmetrically with respect to the longitudinal central axis of the core element.

As can be seen in the figures of EP 2 353 737, however, the edge regions of the sealing surface in particular show additional vibration portions which run perpendicular to the sealing surface.

The publications U.S. Pat. No. 3,939,033 A, EP 2 743 060 A1 U.S. Pat. No. 6,605,178 B1. US 2013/213580 A1 as well as DE 10 2009 026 952 A1 show ultrasonic vibration systems which do not conduct an in-plane vibration, but which are, however, induced by a longitudinal vibration.

Moreover there are often user-specific space-related requirements which cannot be met with the excitation element shown in EP 2 353 737 B1, as the sonotrode which is already very long anyway is further enlarged in longitudinal direction by the converter.

The object of the present invention is therefore to avoid or at least to diminish the above-named disadvantages.

According to the invention this object is achieved by an ultrasonic vibration system according to claim 1.

Because the amplitude transformer or converter no longer acts on the end face of the sonotrode, but rather on the lateral surface, the overall length of the ultrasonic vibration system can be reduced.

In a preferred embodiment it is provided that the sealing surface lies on the lateral surface of the sonotrode.

In a preferred embodiment of the invention, it is provided that the converter or the amplitude transformer is connected to the wing element or the core element. As already described at the beginning, the sonotrode is excited in such a way that the core element and the wing element execute vibrations in opposite directions. The vibrations are therefore greatest on the core element and on the wing element, while the vibration amplitude is lower on those connecting portions that connect the two elements. Because the amplitude transformer or converter acts on the core element or on the wing element, it is ensured that the energy loss when the vibration is transmitted from the converter or amplitude transformer to the sonotrode is minimized.

In a further preferred embodiment, it is provided that the converter or amplitude transformer is connected to the sonotrode in a region which is arranged closer to one sonotrode end face than to the other sonotrode end face.

This asymmetrical arrangement has the advantage that the amplitude transformer and converter can be arranged next to the sonotrode without increasing the overall length of the sonotrode.

In a further preferred embodiment, it is provided that the converter is connected to the sonotrode via an amplitude transformer, wherein the amplitude transformer has an amplitude transformer core element and at least one amplitude transformer wing element, wherein amplitude transformer wing element and amplitude transformer core element are connected to each other via at least two connecting portions. The amplitude transformer wing element is particularly preferably secured on the sonotrode, with the result that a vibration of the amplitude transformer wing element is transmitted to the sonotrode.

Basically the amplitude transformer itself consists of a sonotrode consisting of a core element and a wing element, which are connected to each other via connecting portions.

In a further preferred embodiment, wherein the two wing elements and the core element lie in one plane This embodiment is symmetrical, which leads to a uniform excitation vibration on the wing element. Furthermore, this embodiment offers the possibility that either the amplitude transformer acts or a mounting is arranged on the wing element which is not provided for the processing of a material.

In a further preferred embodiment, it is provided that at least one sonotrode end face has a chamfer, wherein the chamfer is arranged at the edge between sonotrode end face and sealing surface.

This chamfer leads to a shortening of the sealing surface resulting in a reduction in deformation, described above, of the sealing surface at the edge during the vibration.

In a further preferred embodiment, it is provided that the connecting portions are formed by through-holes introduced in the lateral surface, such that the connecting portions are arranged between two adjacent through-holes, wherein preferably the through-holes are elongate and the longitudinal direction thereof extends from the core element to the wing element.

In a particularly preferred embodiment, the through-holes have a width which increases in the direction of the wing element.

Both core element and wing element have a length, a width and a thickness. Here the length is measured in the longitudinal direction, i.e. from one end face to the other end face. The width runs in the plane formed by core element and wing element and the thickness runs perpendicular to the length and width.

In a preferred embodiment, it is provided that the wing element has a thickness which is smaller than the thickness of the core element, wherein the thickness of the wing element is preferably less than 75% and particularly preferably 50-60% of the thickness of the core element.

Alternatively or in combination, in a further preferred embodiment it is provided that the wing element has a width bF which is smaller than the width bK of the core element, wherein the width of the wing element is preferably less than 50% and particularly preferably less than 35% of the width of the core element.

It has been shown that the movement of the sealing surface of the wing element can thereby be increased.

In a further preferred embodiment, it is provided that the wing element is connected to the core element via at least six and at most nine connecting portions. A plurality of tests was able to demonstrate that, in the case of embodiments with fewer than six connecting portions, the proportion of vibrations of the wing element perpendicular to the sealing surface becomes significantly larger. In the case of embodiments with more than nine connecting portions, the number of vibrational modes increases so sharply that it is difficult to excite only the desired bending vibration.

Figure 2:
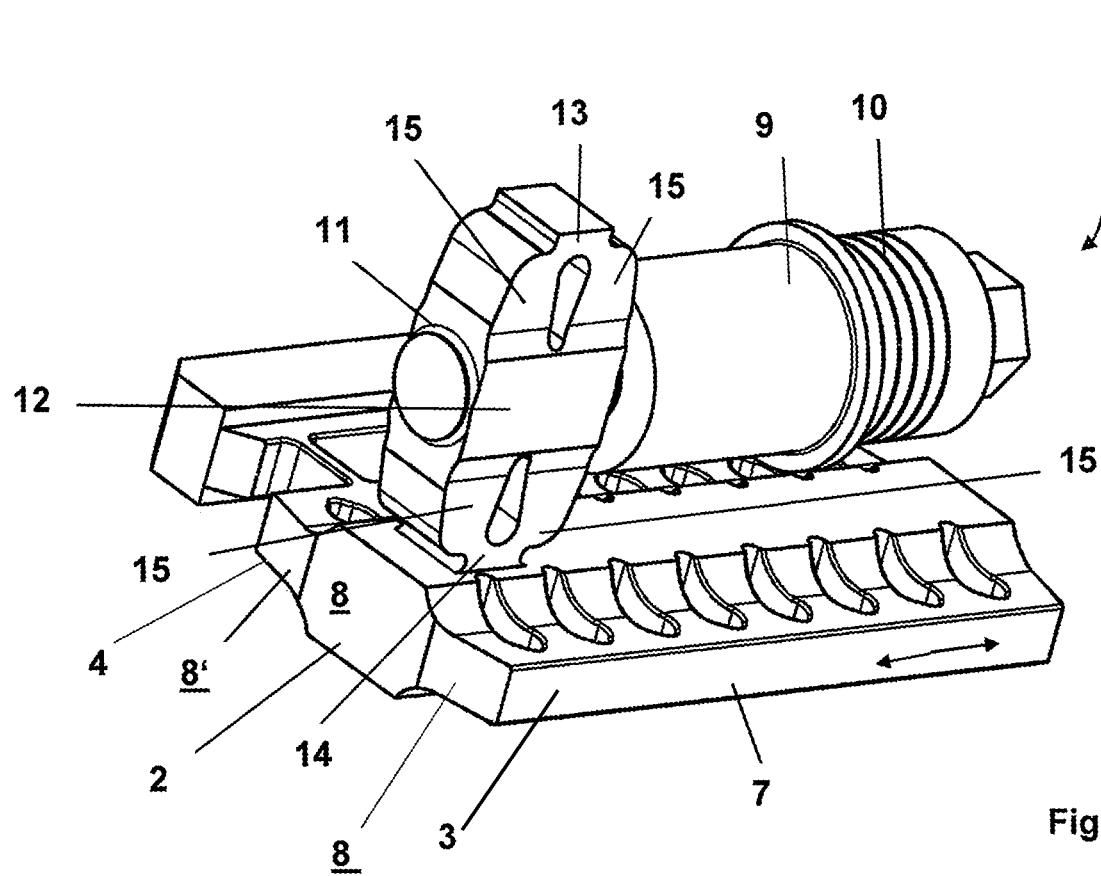
Figure 3:
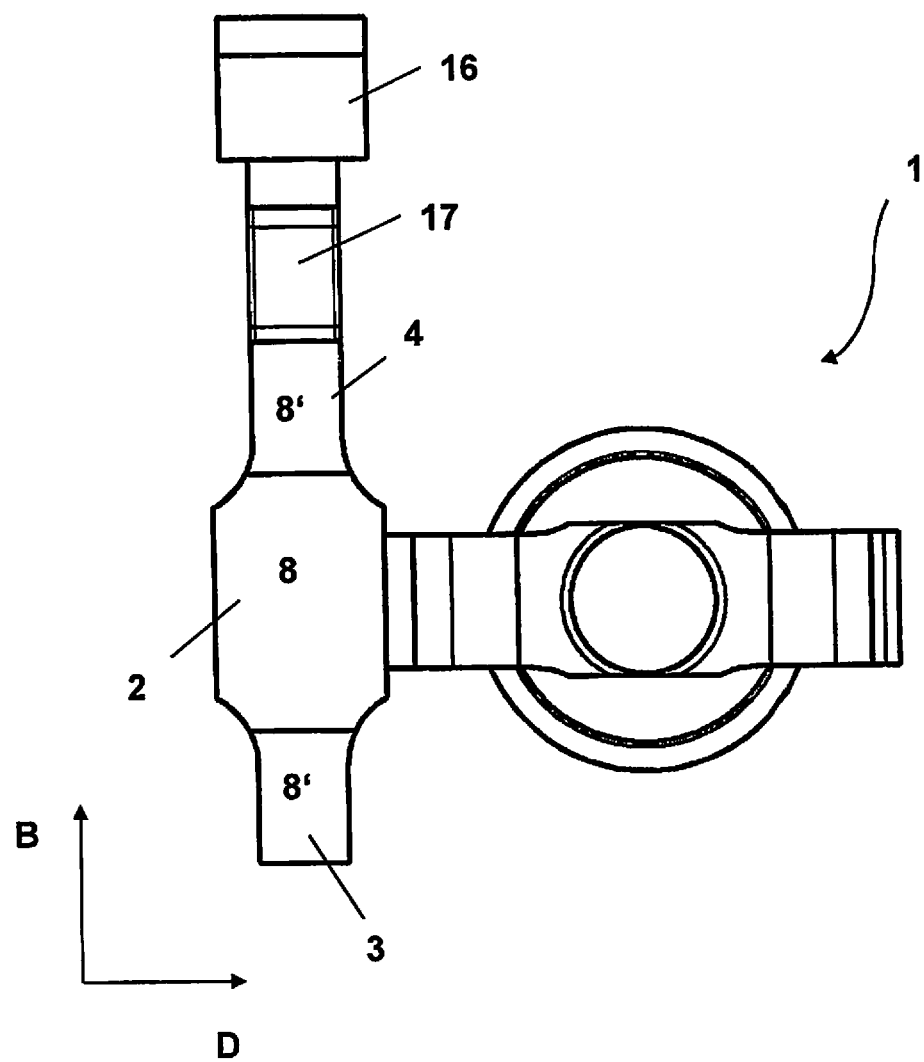
Figure 4:
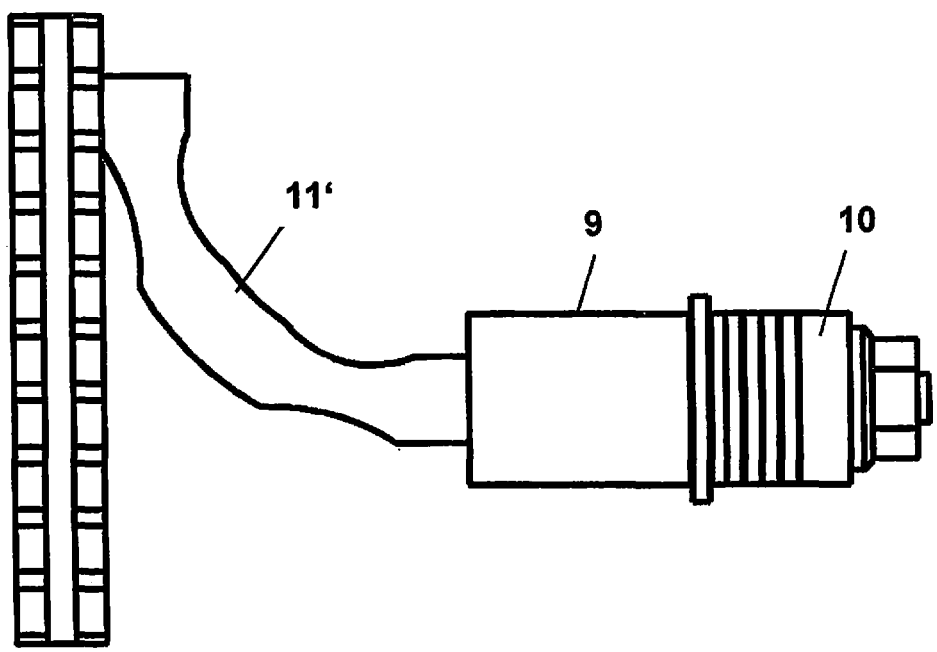
Figure 5:
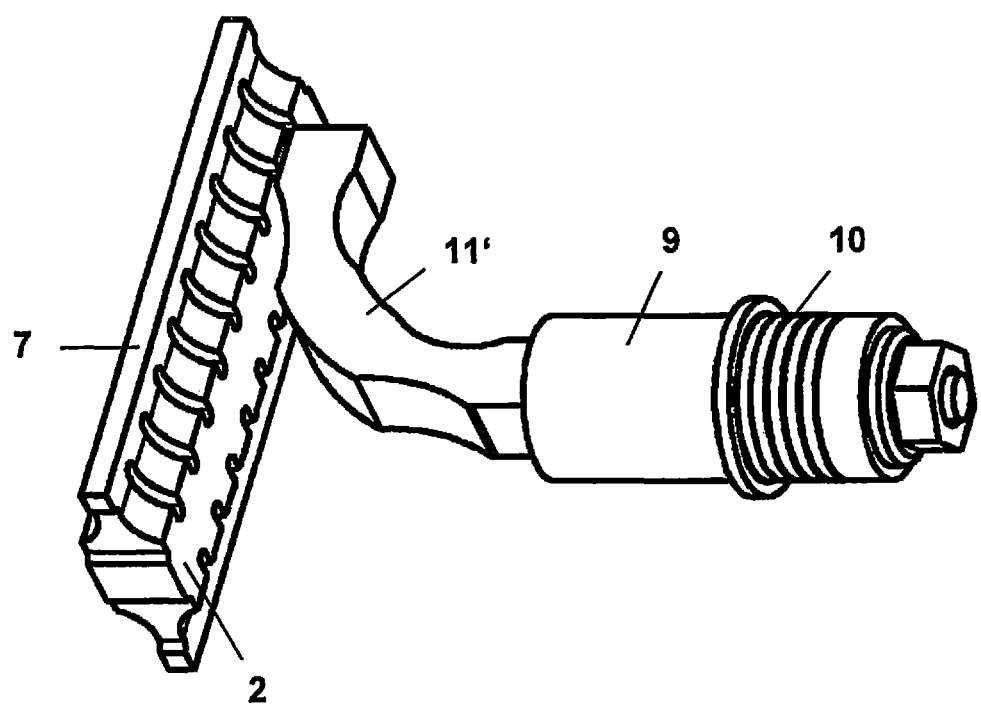

Further advantages, features and possible applications of the present invention become clear with reference to the following description of two embodiments and the associated figures. There are shown in:

FIG. 1 a top view of a first embodiment of an ultrasonic vibration unit according to the invention, FIG. 2 a perspective view of the embodiment of FIG. 2, FIG. 3 a lateral view of the embodiment of FIG. 1, FIG. 4 a top view of a second embodiment of the invention, and FIG. 5 a perspective view of the embodiment of FIG. 4.

A first embodiment of an ultrasonic vibration system 1 is represented in FIG. 1. A perspective view of this embodiment is shown in FIG. 2, while a lateral view is represented in FIG. 3.

The ultrasonic vibration system 1 consists of a sonotrode which in turn has a core element 2 and two wing elements 3, 4. The wing elements 3, 4 are connected to the core element 2 via corresponding connecting portions 5, 6. Both core element 2 and wing elements 3, 4 extend in the longitudinal direction L.

It can be seen in FIG. 2 that the core element 2 has a greater thickness (in the direction D) than the two wing elements 3, 4. Likewise the core element 2 has a width bk (in the direction B) which is greater than the width bp of the wing elements. The core element 2 is designed elongate and has, together with the wing elements 3, 4 and the connecting portions 5, 6, two end faces which are connected to each other via a circumferential lateral surface. The lateral surface can clearly be seen in FIG. 1, while a view of one of the two end faces 8, 8' is represented in FIG. 3. The end face 8, 8' of the sonotrode has two chamfered faces 8'.

A wing element 3 has a sealing surface 7 which is provided to come into contact with the material to be processed. In operation this sealing surface should execute an in-plane vibration which is as homogeneous as possible and the direction of which is represented schematically in FIG. 2 by means of a double arrow.

In order to make such an in-plane vibration of the sealing surface 7 possible, the ultrasonic vibration unit 1 must be excited. In the embodiment shown, the core element 2 is brought into ultrasonic vibration, which is transmitted to the wing elements and in particular to the sealing surface 7 by means of the connecting portions 5, 6. A converter 9 with corresponding piezoelectric elements 10 is used for the excitation, which elements convert an alternating electrical voltage into a longitudinal mechanical ultrasonic vibration. This is transmitted to the amplitude transformer 11, which here has a similar structure to the sonotrode, namely it consists of an amplitude transformer core element 12, amplitude transformer wing elements 13, 14 and connecting portions 15, which connects the amplitude transformer core element 12 to the amplitude transformer wing elements 13, 14.

Because the converter 9 is coupled to the amplitude transformer 11, the amplitude transformer core element 12 is brought into in-plane vibration, which is transmitted to the amplitude transformer wing elements 13, 14 via the connecting portions 15. As the amplitude transformer wing element 14 is connected to the core element 2 of the sonotrode, the vibration is transmitted to the sonotrode and thus to the sealing surface 7. As a result a very compact embodiment of an ultrasonic vibration unit 1 is obtained.

In order to have as little influence on the vibration amplitude as possible, a mounting which is formed from a mounting bar 16, which can be securely connected to a machine stand, and corresponding flexible elements 17 is provided on the side of the sonotrode facing away from the sealing surface 7, i.e. on the wing element 4. Holes can be arranged in the mounting bar 16 in order to secure the mounting bar 16 on the machine stand. Here, wing element 4, flexible elements 17 and mounting bar 16 form rigid body links. The flexible elements 17 have a length of approximately 14 mm in the direction B. The flexible elements 17 are formed by lamellar elements which have a much smaller dimension in the longitudinal direction L than in the two directions B and D perpendicular thereto. This results in the flexible elements having a much greater flexibility in the longitudinal direction L than in the directions perpendicular thereto. This measure makes it possible for the sonotrode to be reliably mounted even when a welding force is exerted on the sealing surface, while at the same time due to the flexible elements the in-plane vibration of the wing element 4 is influenced only slightly.

It can be seen in FIG. 1 that all the flexible elements 17 act on the wing element at least partly in the region of a projection of the connecting portions onto the wing element 4. The projections are drawn in as dotted lines in FIG. 1.

In the example represented, the wing element 3 is connected to the core element 2 via a total of nine connecting portions 5, 6. It can be seen that the end faces each have on both sides a chamfered face in the direction of the wing elements, whereby the width of the outer connecting portions 6 is reduced. The vibration behaviour of the sonotrode can be improved by means of this measure.

A second embodiment of the invention is shown in FIGS. 4 and 5. Here the sonotrode is designed in the same way as in the embodiment shown in FIGS. 1 to 3. The only difference here is that a different amplitude transformer is used. This essentially consists of a curved element 11' which converts the longitudinal ultrasonic vibration produced by the converter 9 into an in-plane vibration by means of the piezoelectric discs 10. The curved amplitude transformer 11' is then connected again to the core element 2 of the sonotrode.

The mounting can be effected as in the embodiment shown in FIGS. 1 to 3. The mounting is, however, not depicted in FIGS. 4 and 5.

REFERENCE NUMBERS 1 ultrasonic vibration system/ultrasonic vibration unit
2 core element
3 wing element
4 wing element
5 connecting portion
6 connecting portion
7 sealing surface
8, 8' end face
9 converter
10 piezoelectric element
11 amplitude transformer
11' curved element
12 amplitude transformer core element
13 amplitude transformer wing element
14 amplitude transformer wing element
15 connecting portions
16 mounting bar
17 flexible elements

The invention claimed is:

1. Ultrasonic vibration system (1) with a sonotrode which has two sonotrode end faces (8, 8') and a circumferential lateral surface that connects the two sonotrode end faces (8, 8') to each other, wherein the sonotrode has an elongate core element (2) and at least one wing element (3, 4), wherein the elongate core element (2) and the at least one wing element (3, 4) each extend from one sonotrode end face (8, 8') to the other sonotrode end face (8, 8') in a longitudinal direction, wherein the at least one wing element (3, 4) has a sealing surface (7) which is provided to come into contact with a material for the processing thereof and is connected to the elongate core element (2) via a plurality of connecting portions (5, 6) spaced apart from each other in the longitudinal direction, and a converter (9) which is connected to the sonotrode, optionally via an amplitude transformer (11), characterized in that the converter (9) or the amplitude transformer (11) is connected to the lateral surface of the sonotrode and the sonotrode comprises the at least one wing element (3, 4) which is connected to the elongate core element (2) via a plurality of connection portions (5, 6) spaced apart from each other in the longitudinal direction of the elongate core element (2), wherein the at least one wing element (3, 4) extends from one sonotrode end face (8, 8') to the other sonotrode end face (8, 8') in a longitudinal direction.

2. Ultrasonic vibration system (1) according to claim 1, characterized in that the converter (9) is connected to the at least one wing element (3, 4).

3. Ultrasonic vibration system (1) according to claim 1, characterized in that the converter (9) is connected to the sonotrode in a region which is arranged closer to one sonotrode end face (8) than to the other sonotrode end face (8').

4. Ultrasonic vibration system (1) according to claim 1, characterized in that the converter is connected to the sonotrode via an amplitude transformer, the amplitude transformer (11) having an amplitude transformer core element (12) and at least one amplitude transformer wing element (13, 14), wherein the at least one amplitude transformer wing element (13, 14) and amplitude transformer core element (12) are connected to each other via at least two connecting portions (15).

5. Ultrasonic vibration system (1) according to claim 1, characterized in that the at least one wing element (3, 4) and the core element (2) lie in one plane.

6. Ultrasonic vibration system (1) according to claim 1, characterized in that at least one sonotrode end face (8, 8') has a chamfer, wherein the chamfer is arranged at an edge between the at least one sonotrode end face (8, 8') and the sealing surface (7).

7. Ultrasonic vibration system (1) according to claim 1 characterized in that the connecting portions (5, 6) are formed between through-holes introduced in the lateral surface.

8. Ultrasonic vibration system (1) according to claim 7, characterized in that the through-holes have a width which increases in the direction of the at least one wing element (3, 4).

9. Ultrasonic vibration system (1) according to claim 1, characterized in that the at least one wing element (3, 4) is connected to the core element (2) via at least 6 and at most 9 connecting portions (5, 6).

10. Ultrasonic vibration system (1) according to claim 1, characterized in that the at least one wing element has a thickness which is smaller than the thickness of the core element, wherein the thickness of the at least one wing element is less than 75% of the thickness of the core element.

11. Ultrasonic vibration system (1) according to claim 1, characterized in that the at least one wing element has a width which is smaller than the width of the core element, wherein the width of the at least one wing element is less than 50% of the width of the core element.

12. Ultrasonic vibration system according to claim 1, characterized in that the sealing surface is arranged on the lateral surface.

13. Ultrasonic vibration system (1) according to claim 1, characterized in that the converter (9) is connected to the core element (2).

14. Ultrasonic vibration system (1) according to claim 1, characterized in that amplitude transformer (11) is connected to the at least one wing element (3, 4).

15. Ultrasonic vibration system (1) according to claim 1, characterized in that amplitude transformer (11) is connected to the core element (2).

16. Ultrasonic vibration system (1) according to claim 1, characterized in that the amplitude transformer (11) is connected to the sonotrode in a region which is arranged closer to one sonotrode end face (8) than to the other sonotrode end face (8').

17. Ultrasonic vibration system (1) according to claim 7, surface wherein the through-holes are elongate and the longitudinal direction thereof extends from the core element (2) to the at least one wing element (3, 4).

18. Ultrasonic vibration system (1) according to claim 11, of the core element, wherein the width of the at least one wing element (3, 4) is less than 35% of the width of the core element.

19. Ultrasonic vibration system (1) according to claim 4 wherein the amplitude transformer core element (12) is connected to a converter (9).

20. Ultrasonic vibration system (1) including:
a sonotrode having two sonotrode end faces (8, 8') and a circumferential lateral surface that connects the two sonotrode end faces (8, 8') to each other, wherein the sonotrode has an elongate core element (2) and two wing elements (3, 4), wherein the elongate core element (2) and the two wing elements (3, 4) each extend from one sonotrode end face (8, 8') to the other sonotrode end face (8, 8') in a longitudinal direction, wherein at least one of the two wing elements (3, 4) has a sealing surface (7) which is provided to come into contact with a material for the processing thereof and is connected to the elongate core element (2) via a plurality of connecting portions (5, 6) spaced apart from each other in the longitudinal direction, and a converter (9) which is connected to the sonotrode, optionally via an amplitude transformer (11), wherein the converter (9) or the amplitude transformer (11) is connected to the lateral surface of the sonotrode.

\* \* \* \* \*